(12) United States Patent
Griffin et al.

(10) Patent No.: US 9,248,815 B2
(45) Date of Patent: Feb. 2, 2016

(54) SYSTEM AND METHOD FOR EMERGENCY BRAKING (71) Applicant: Robert Bosch GmbH, Stuttgart (DE)

(72) Inventors: Gregory Griffin, Ann Arbor, MI (US); Daniel Kwiatkowski, Livonia, MI (US); Joseph Miller, Howell, MI (US)

(73) Assignee: Robert Bosch GmbH, Stuttgart (DE)

(*) Notice: Subject to any disclaimer, the term of this patent is extended or adjusted under 35 U.S.C. 154(b) by 33 days.

(21) Appl. No.: 13/841,328

(22) Filed: Mar. 15, 2013

(65) Prior Publication Data
US 2014/0159476 A1 Jun. 12, 2014

Related U.S. Application Data (60) Provisional application No. 61/734,468, filed on Dec. 7, 2012.

(51) Int. Cl.
*B60T 8/62* (2006.01)
*B60T 8/28* (2006.01)
*B60T 7/12* (2006.01)
*B60T 8/32* (2006.01)
*B60T 13/14* (2006.01)
(Continued)

(52) U.S. Cl.
CPC ... *B60T 8/28* (2013.01); *B60T 7/12* (2013.01); *B60T 8/268* (2013.01); *B60T 8/321* (2013.01); *B60T 8/3275* (2013.01); *B60T 8/72* (2013.01); *B60T 13/146* (2013.01); *B60T 13/662* (2013.01); *B60T 8/4872* (2013.01); *B60T 2201/03* (2013.01)

(58) Field of Classification Search
CPC ............. B60T 8/26; B60T 8/28; B60T 8/321; B60T 8/3255; B60T 8/3275; B60T 8/4827; B60T 8/4872; B60T 8/1764

USPC ................................ 303/9.62, 9.71, 186, 187
See application file for complete search history.

(56) References Cited

U.S. PATENT DOCUMENTS 5,711,151 A 1/1998 Engfer
5,842,755 A 12/1998 Sugimoto et al.
(Continued)

FOREIGN PATENT DOCUMENTS

GB 2136519 9/1984

OTHER PUBLICATIONS

International Search Report for International Appl. No. PCT/US2013/073113, dated May 26, 2014, 5 pages.
(Continued)

*Primary Examiner* — Thomas J Williams
(74) *Attorney, Agent, or Firm* — Michael Best & Friedrich LLP (57) ABSTRACT

A method for automatically decelerating a vehicle having a first side with a first front wheel brake and a first rear wheel brake and second side with a second front wheel brake and a second rear wheel brake, and in which the vehicle further has a braking system with a pump operable to deliver a flow of pressurized hydraulic fluid to the first and second front wheel brakes and to the first and second rear wheel brakes, includes receiving a signal associated with an emergency braking event. The method further includes increasing the hydraulic pressure at the first and second front wheel brakes at a greater rate than at the first and second rear wheel brakes. The method also includes directing hydraulic fluid from the first front wheel brake to the second rear wheel brake upon achieving a targeted level of deceleration or wheel slip.

11 Claims, 6 Drawing Sheets

(51) Int. Cl.
B60T 13/66 (2006.01)
B60T 8/26 (2006.01)
B60T 8/72 (2006.01)
B60T 8/48 (2006.01)

(56) References Cited

U.S. PATENT DOCUMENTS

| | | | |
|---|---|---|---|
| 6,019,442 | A | 2/2000 | Zechmann et al. |
| 6,446,490 | B1 | 9/2002 | Lohner et al. |
| 6,612,661 | B2 | 9/2003 | Udaka |
| 7,661,773 | B2 | 2/2010 | Narita et al. |
| 2006/0097570 | A1 | 5/2006 | Doerr et al. |
| 2009/0026835 | A1 | 1/2009 | Matsubara et al. |
| 2009/0273231 | A1 | 11/2009 | Knechtges |
| 2012/0239265 | A1* | 9/2012 | Kato et al. ............ 701/70 |

OTHER PUBLICATIONS

Written Opinion for International Appl. No. PCT/US2013/073113, dated May 26, 2014, 5 pages.

* cited by examiner

SYSTEM AND METHOD FOR EMERGENCY BRAKING

BACKGROUND

The present invention relates to a system and method for controlling the hydraulic pressure within an emergency braking system.

SUMMARY

The invention provides an improved hydraulic emergency braking system control strategy that includes modifying and controlling the brake pressure build profile for the front and rear axles of a vehicle, leading to greater vehicle stability and more efficient use of system hydraulic energy in view of the limited electrical/hydraulic power available from the brake modulation system.

In one embodiment of a method for automatically decelerating a vehicle having a first side with a first front wheel brake and a first rear wheel brake and second side with a second front wheel brake and a second rear wheel brake, and in which the vehicle further has a braking system with a pump operable to deliver a flow of pressurized hydraulic fluid to the first and second front wheel brakes and to the first and second rear wheel brakes, the method includes receiving a signal associated with an emergency braking event. The method further includes increasing the hydraulic pressure at the first and second front wheel brakes at a greater rate than at the first and second rear wheel brakes. The method also includes directing hydraulic fluid from the first front wheel brake to the second rear wheel brake upon achieving a targeted level of deceleration or wheel slip.

In one embodiment of a method for automatically decelerating a vehicle having a first side with a first front wheel brake and a first rear wheel brake and second side with a second front wheel brake and a second rear wheel brake, and in which the vehicle further has a braking system with a pump operable to deliver a flow of pressurized hydraulic fluid to the first and second front wheel brakes and to the first and second rear wheel brakes, the method includes receiving a signal associated with an emergency braking event. The method further includes increasing the hydraulic pressure at the first and second front wheel brakes at a greater rate than at the first and second rear wheel brakes. The method also includes increasing the hydraulic pressure at the first and second rear wheel brakes while maintaining hydraulic pressure at the first and second front wheel brakes upon achieving a targeted level of deceleration or wheel slip.

In one embodiment of a braking system for autonomously decelerating a vehicle without vehicle driver input, in which the vehicle includes a first front wheel brake and a first rear wheel brake proximate a vehicle first side and a second front wheel brake and a second rear wheel brake proximate a vehicle second side, the system includes a first hydraulic circuit operably associated with the first front wheel brake and the second rear wheel brake and a second hydraulic circuit operatively associated with the second front wheel brake and the first rear wheel brake. A controller is configured to receive a signal associated with an emergency braking event, increase the hydraulic pressure at the first and second front wheel brakes at a greater rate than at the first and second rear wheel brakes, and, upon achieving a targeted level of deceleration or wheel slip, direct hydraulic fluid from the first front wheel brake to the second rear wheel brake.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
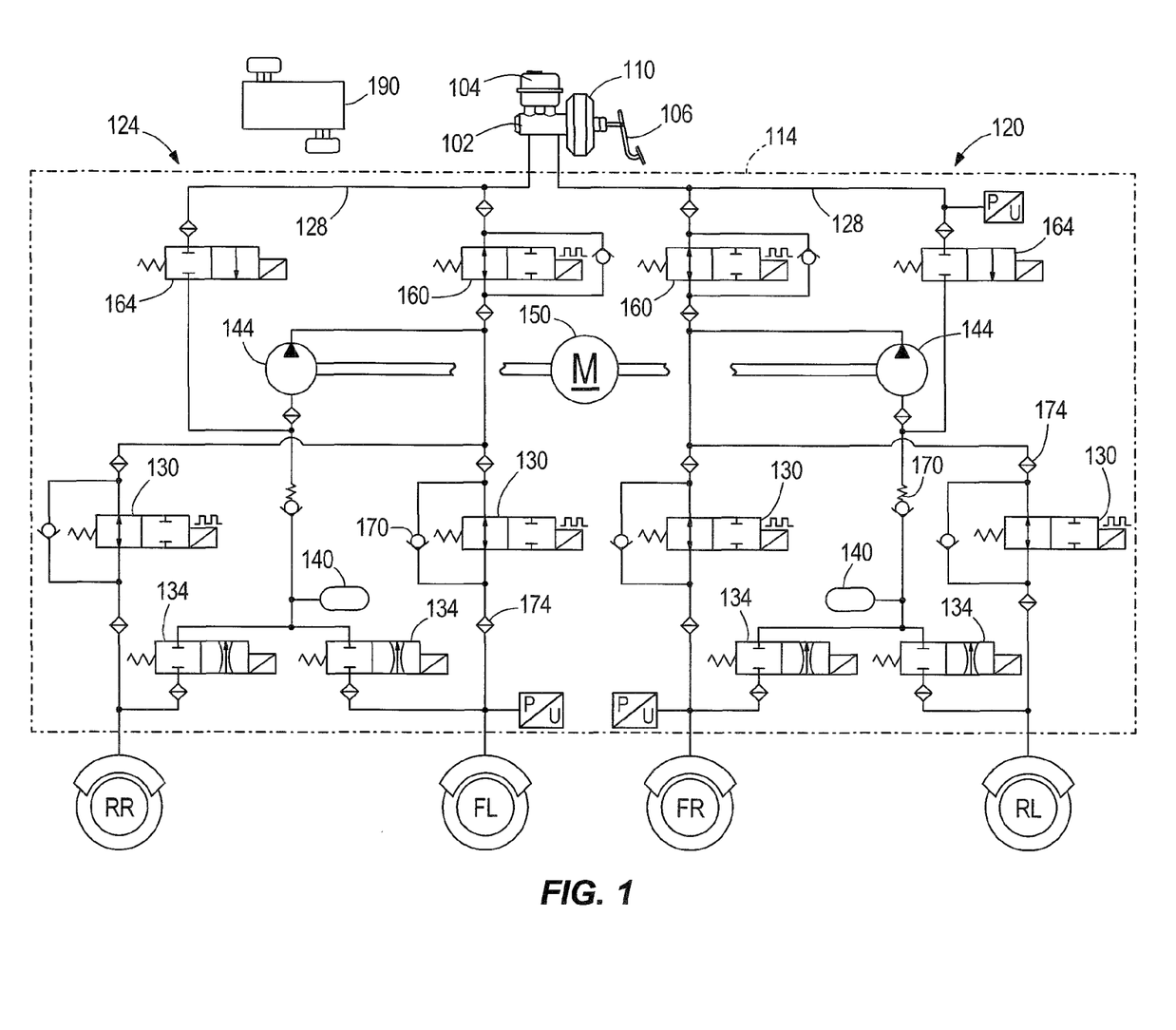
FIG. 1 is a schematic of a diagonally split hydraulic brake system circuit.
Figure 2:
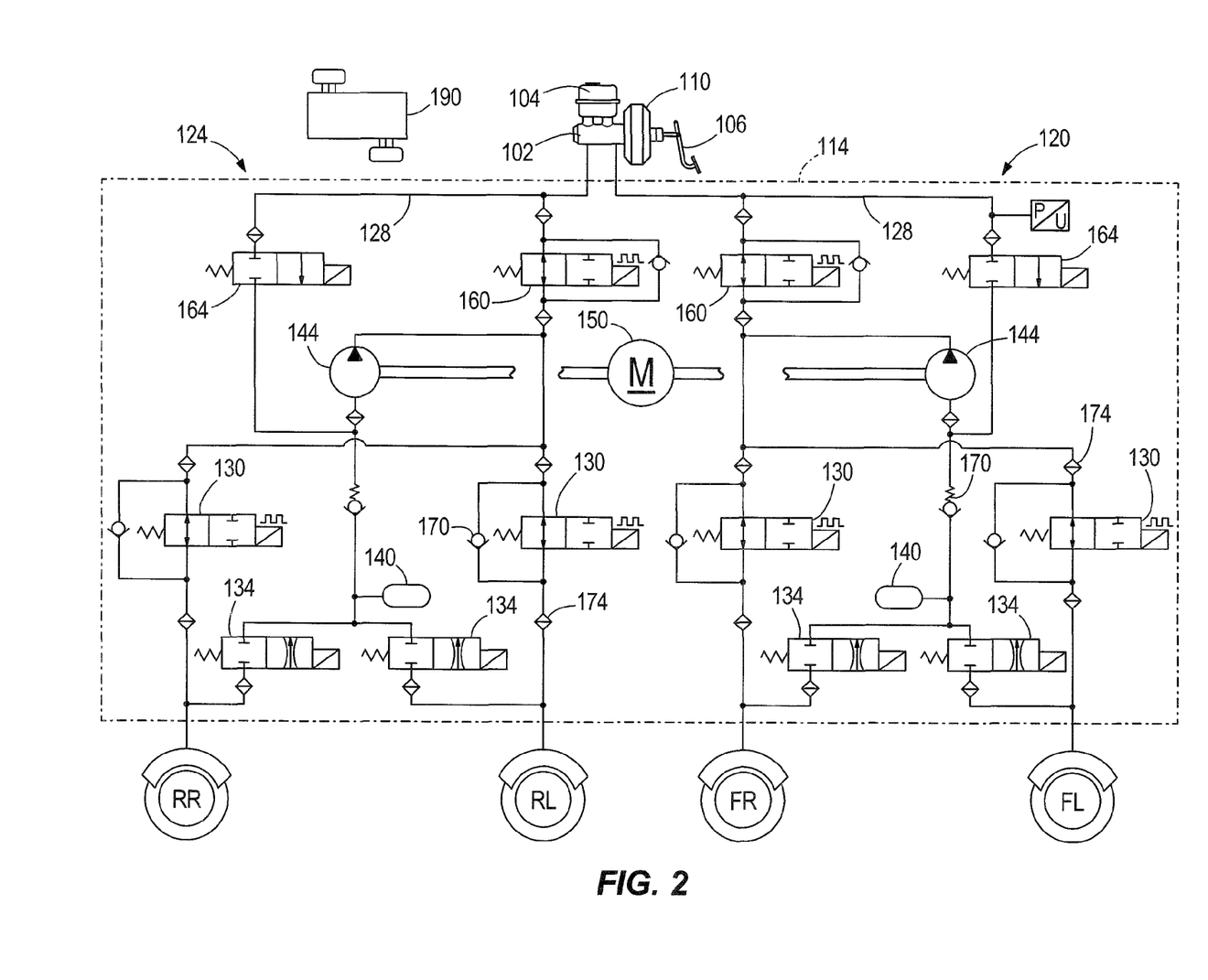
FIG. 2 is a schematic of a parallel hydraulic brake system circuit.

FIGS. 1 and 2 illustrate a brake-pressure modulation device in a brake system of a motor vehicle. The system includes a brake master cylinder 102 with a reservoir 104 actuated by means of a pedal 106 coupled to a brake booster 110. A hydraulic unit 114 operatively coupled to the master cylinder 102 is comprised of first and second circuits 120, 124. FIG. 1 illustrates a diagonally split system such that the first and second circuits 120, 124 separately control 1) the front-right (FR) and rear-left (RL) wheels and 2) the rear-right (RR) and front-left (FL) wheels. FIG. 2 illustrates a parallel system such that the first and second circuits 120, 124 separately control the front wheels (FR, FL) and the rear wheels (RR, RL). Each circuit 120, 124 includes an outlet 128 from the master cylinder 102, and an inlet solenoid valve 130 and an outlet solenoid valve 134 for carrying out braking operations on each wheel brake. The brake-pressure modulation device also includes, for each circuit 120, 124, a low-pressure accumulator 140 and a return pump 144. The return pump 144 is driven by an electric motor 150.

For traction control, each circuit 120, 124 further includes a changeover valve 160 and a shut-off valve 164 mounted between the master cylinder 102 and the return pump 144. The valves 130, 134, 160, 164 are electromagnetic solenoid valves. Various other functional components are illustrated in FIGS. 1 and 2, to include relief valves 170 and filters 174, not all of which are numbered to provide greater clarity.

A control unit 190 controls the operation of the vehicle braking associated with the circuits 120, 124, to include anti-lock braking and traction control, and the emergency braking sequences to be further described below.

A hydraulic brake system for a road vehicle, such as shown in FIGS. 1 and 2, has a certain brake effectiveness, generally defined as brake torque that can be generated by a given amount of hydraulic pressure, and a certain brake stiffness, generally defined as the brake pressure that can be generated by a given flow volume of hydraulic fluid. The brake stiffness and the brake effectiveness are typically not equal between the front axle (wheels FR and FL) and the rear axle (wheels RR and RL).

As known by those of ordinary skill in the art, during braking, deceleration forces at the center of gravity of the vehicle, which is above the level at which tire forces are transmitted to the ground, increase the vertical force loading on the front axle and decrease the vertical force loading on the rear axle. These vertical loading forces are further influenced by the design, tuning, and state of the vehicle's suspension, which can significantly affect the loading profile over time at each axle. These effects can be most pronounced for rapidly changing vehicle deceleration. Modern braking systems use closed loop feedback control using various sensors and a brake pressure modulation system to modify (lessen) the increase of brake pressure to the rear axle relative to the pressure being supplied to the front axle above some predetermined amount.

Vehicle sensing systems make use of cameras, radar, or other "smart" technology to detect a potential emergency braking event and provide an external signal to initiate a slowing of the vehicle without driver brake pedal input. Although automatic or autonomous braking offers quicker reaction and faster deceleration than possible through driver-initiated braking, such systems can, by commanding the brake modulation system to build hydraulic pressure to automatically rapidly decelerate the vehicle, cause an uncontrolled pressure build-up at both the front and rear axles. This rate of pressure build at both axles is a function of the flow rate to the brakes and the stiffness of the brakes receiving the flow.

The control strategy of the present invention modifies the build-up of brake pressure between the front and rear axles over the course of an autonomous braking event, i.e., a braking event automatically initiated and controlled by a subsystem not influenced or directed by the vehicle driver.

Figure 3:
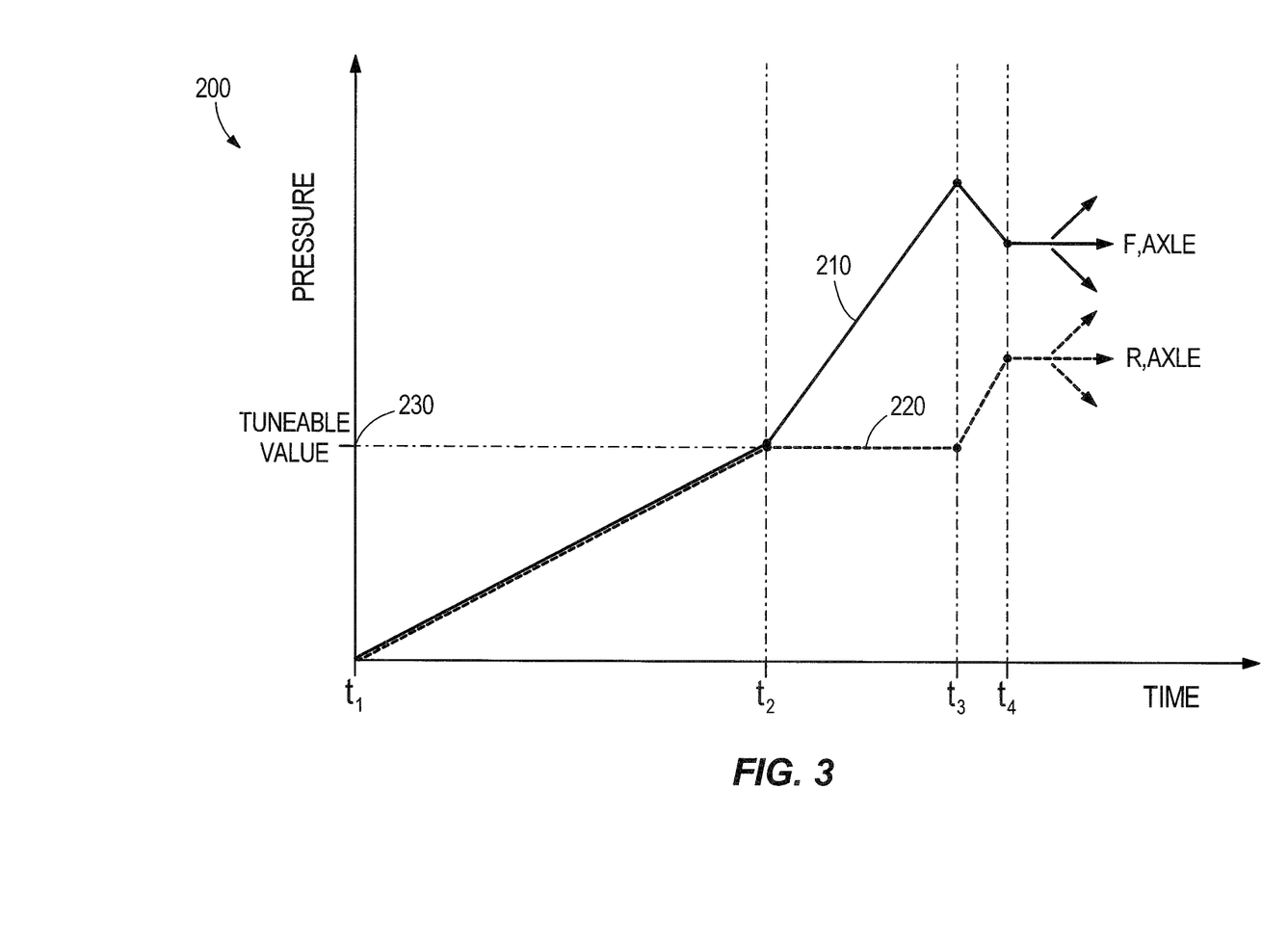
FIG. 3 is a brake pressure versus time graph of a diagonally split hydraulic brake system in accordance with the invention.
Figure 4:
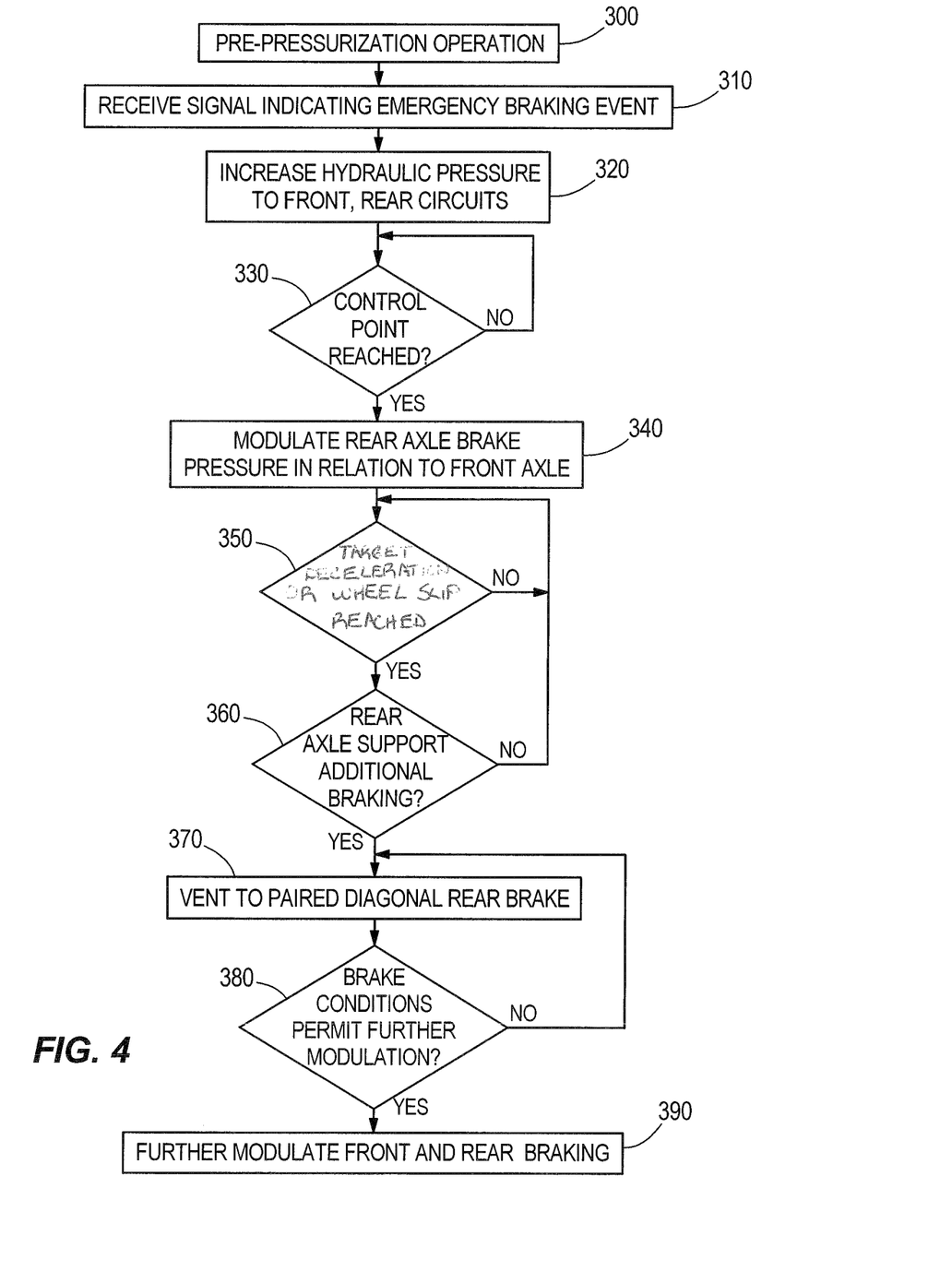
FIG. 4 is a flow chart of a method of braking a diagonally split hydraulic brake system in accordance with the invention.

FIG. 3 illustrates a graph 200 of the hydraulic brake pressure for the front axle (line 210) and for the rear axle (line 220) of a diagonally split system over time during an autonomous braking event occurring at time $t_1$. Prior to time $t_1$, in response to a first signal from the vehicle sensing system, the braking system may initiate a "pre-pressurization" operation of the pump 144 to re-seat the brake pads into optimal position and thereby remove the lag time associated with the volumetric inefficiencies caused by "knockback," a brake system phenomenon understood by those of skill in the art. Referring to FIGS. 3 and 4, after any pre-pressurization to eliminate the effects of knockback (step 300), upon receiving a signal from the controller 190 associated with an emergency braking event (step 310), the braking system actuates an automatic braking sequence and hydraulic pressure builds in both the front and the rear brakes (step 320) from time $t_1$ until a predetermined pressure or control point 230 is reached at time $t_2$ (step 330). This buildup of pressure may occur at an equal rate, as illustrated, or may be a different rate for the front brakes and for the rear brakes. The control point 230 is a tuneable value that is a function of the particular vehicle dynamics and the specific brake system and represents a condition at or near the Z-critical deceleration point. The point 230 is not necessarily a function of wheel slip, specific brake pressure, or deceleration but is tuned to maximize the highest level of vehicle deceleration in the shortest possible time. At time $t_2$ pressure to the rear axle brakes (one in each circuit 120, 124 of FIG. 1) is modulated to a rate less than the rate for the front axle brakes (step 340). In some applications, the modulation of pressure to the rear axle is a generally steady pressure hold, as shown in FIG. 3.

Due to the modulation of the pressure to the rear axle, all of the hydraulic flow from the modulation system is now provided exclusively to the front brakes, i.e., both circuits 120, 124 are active but feed only the front axle brakes (FR, FL), as the front axle pressure build continues. The front axle brakes, which have higher vertical loading due to vehicle weight distribution and braking dynamics, can support a higher brake torque than the rear brakes and are more efficient at generating brake torque per hydraulic flow volume (a product of brake effectiveness and brake stiffness).

When the vehicle achieves its targeted level of deceleration or wheel slip at time $t_3$ (step 350), if the rear axle can support additional braking at time $t_3$ (step 360), the high pressure fluid at a front axle brake can be released, or vented, to the paired diagonal rear axle brake (e.g., FL to RR or FR to RL) if necessary (step 370). At time $t_4$, if permitted by the current braking conditions (step 380), more traditional hydraulic brake modulation, i.e., anti-lock braking, may occur as the vehicle is at or above its target deceleration or wheel slip (step 390).

With this control strategy, hydraulic energy is not wasted by pressure dumps to a low pressure accumulator and the more efficient front axle brakes receive all of the hydraulic flow subsequent to the rear axle pressure hold. Additionally, the stability of the vehicle is enhanced because the rear axle pressure hold is initiated at an appropriately determined level to prevent hydraulic overshoot of pressure control on the rear axle.

Figure 5:
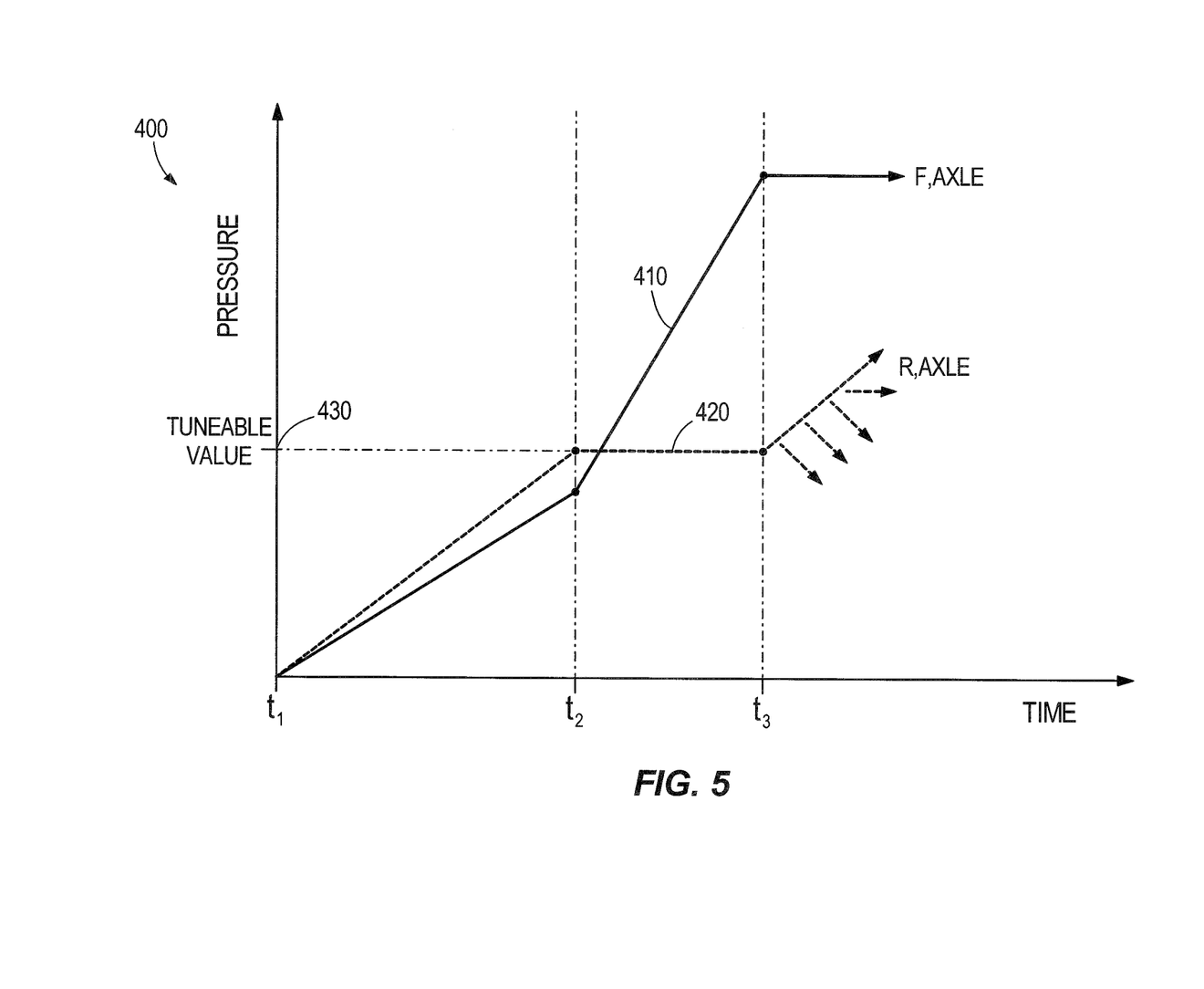
FIG. 5 is a brake pressure versus time graph of a parallel hydraulic brake system in accordance with the invention.
Figure 6:
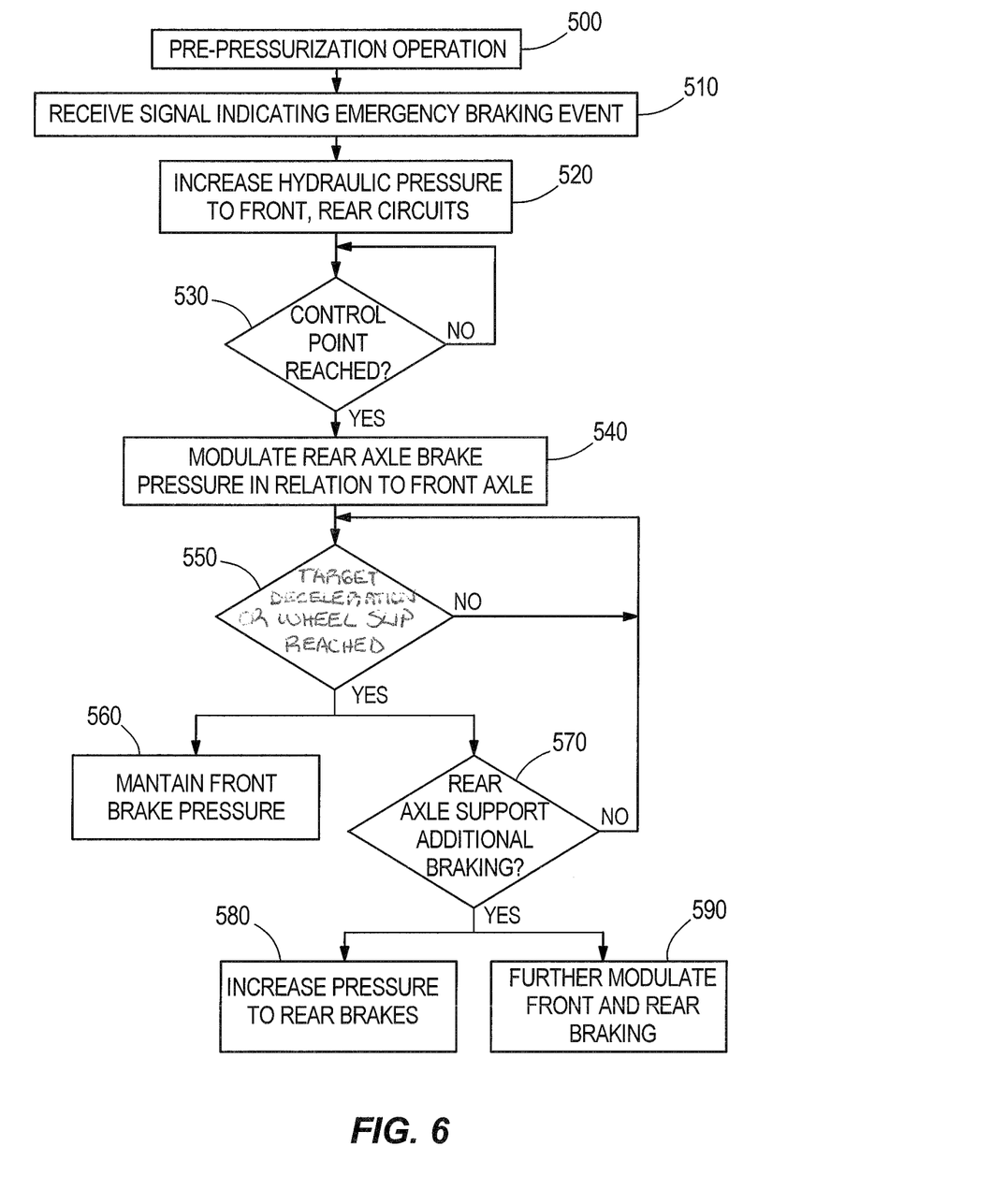
FIG. 6 is a flow chart of a method of braking a parallel hydraulic brake system in accordance with the invention.

FIG. 5 illustrates a graph 400 of the hydraulic brake pressure for the front axle (line 410) and for the rear axle (line 420) of a front/rear split or parallel system over time during an autonomous braking event occurring at time $t_1$. As with the diagonally split system, the braking system may initiate a "pre-pressurization" operation of the pump 144 prior to time $t_1$ to remedy the effects of knockback. Referring to FIGS. 5 and 6, after any pre-pressurization to eliminate the effects of knockback (step 500), upon receiving a signal from the controller 190 associated with an emergency braking event (step 510), the braking system actuates an automatic braking sequence and hydraulic pressure builds in both the front and the rear hydraulic circuits 120, 124 (step 520) from time $t_1$ until a predetermined pressure or control point 430 at time $t_2$ (step 530), as previously described. Though illustrated as a different rate of pressure buildup for the front and rear brakes, the rate may be the same for each, as shown in FIG. 3. At time $t_2$ pressure to the rear axle brakes (circuit 124 of FIG. 2) is modulated to a rate less than the rate for the front axle brakes (step 540), e.g., modulated to a steady pressure hold, as shown in FIG. 5. As with the diagonally split system, the hydraulic flow is now provided exclusively to the front brakes, i.e., circuit 120 is active and feeds the front axle brakes (FR, FL).

When the front axle brakes reach the targeted brake levels, determined in part by wheel slide and/or deceleration at time $t_3$ (step 550), the front brakes can be maintained at a pressure hold (step 560). If the rear axle can support additional braking at time $t_3$ (step 570) pressure can optionally be increased to the rear axle brakes (circuit 124 of FIG. 2) (step 580) in conjunction with further hydraulic brake modulation, such as anti-lock braking (step 590).

Various features and advantages of the invention are set forth in the following claims.

The invention claimed is:

1. A method for automatically decelerating a vehicle having a first side with a first front wheel brake and a first rear wheel brake and second side with a second front wheel brake and a second rear wheel brake, the vehicle further having a braking system with a pump operable to deliver a flow of pressurized hydraulic fluid to the first and second front wheel brakes and to the first and second rear wheel brakes, the method comprising:
receiving a signal associated with an emergency braking event;
increasing the hydraulic pressure at the first and second front wheel brakes at a greater rate than at the first and second rear wheel brakes; and
upon achieving a targeted level of deceleration or wheel slip, directing hydraulic fluid from the first front wheel brake to the second rear wheel brake,
wherein increasing the hydraulic pressure to the front wheel brakes at a greater rate than to the rear wheel brakes is initiated at a predetermined braking system control point, further including increasing hydraulic pressure at the front and rear wheel brakes in response to receiving the signal, and further including operating the pump to pressurize the braking system prior to the increasing hydraulic pressure at the front and rear wheel brakes in response to receiving the signal.

2. The method of claim 1, wherein increasing the hydraulic pressure to the front wheel brakes at a greater rate than to the rear wheel brakes includes maintaining the hydraulic pressure of the rear wheel brakes at a constant value.

3. The method of claim 1, wherein increasing the hydraulic pressure to the front wheel brakes at a greater rate than to the rear wheel brakes includes providing all flow of hydraulic fluid to the front wheel brakes.

4. The method of claim 1, wherein the increasing hydraulic pressure at the front and rear wheel brakes in response to receiving the signal ceases at the predetermined braking system control point.

5. A method for automatically decelerating a vehicle having a first side with a first front wheel brake and a first rear wheel brake and second side with a second front wheel brake and a second rear wheel brake, the vehicle further having a braking system with a pump operable to deliver a flow of pressurized hydraulic fluid to the first and second front wheel brakes and to the first and second rear wheel brakes, the method comprising:
receiving a signal associated with an emergency braking event;
increasing the hydraulic pressure at the first and second front wheel brakes at a greater rate than at the first and second rear wheel brakes; and
upon achieving a targeted level of deceleration or wheel slip, directing hydraulic fluid from the first front wheel brake to the second rear wheel brake,
wherein increasing the hydraulic pressure to the front wheel brakes at a greater rate than to the rear wheel brakes is initiated at a predetermined braking system control point, further including increasing hydraulic pressure at the front and rear wheel brakes in response to receiving the signal, wherein increasing hydraulic pressure at the front and rear wheel brakes in response to receiving the signal includes increasing hydraulic pressure at the front and rear wheel brakes at an equal rate.

6. The method of claim 1, further including upon achieving a targeted level of deceleration or wheel slip, causing hydraulic fluid at the second front wheel brake to flow to the first rear wheel brake.

7. A method for automatically decelerating a vehicle having a first side with a first front wheel brake and a first rear wheel brake and second side with a second front wheel brake and a second rear wheel brake, the vehicle further having a braking system with a pump operable to deliver a flow of pressurized hydraulic fluid to the first and second front wheel brakes and to the first and second rear wheel brakes, the method comprising:
receiving a signal associated with an emergency braking event;
increasing the hydraulic pressure at the first and second front wheel brakes at a greater rate than at the first and second rear wheel brakes; and
upon achieving a targeted level of deceleration or wheel slip, increasing the hydraulic pressure at the first and second rear wheel brakes while maintaining hydraulic pressure at the first and second front wheel brakes,
wherein increasing the hydraulic pressure to the front wheel brakes at a greater rate than to the rear wheel brakes is initiated at a predetermined braking system control point, further including increasing hydraulic pressure at the front and rear wheel brakes in response to receiving the signal, and further including operating the pump to pressurize the braking system prior to the increasing hydraulic pressure at the front and rear wheel brakes in response to receiving the signal.

8. The method of claim 7, wherein increasing the hydraulic pressure to the front wheel brakes at a greater rate than to the rear wheel brakes includes maintaining the hydraulic pressure of the rear wheel brakes at a constant value.

9. The method of claim 7, wherein increasing the hydraulic pressure to the front wheel brakes at a greater rate than to the rear wheel brakes includes providing all flow of hydraulic fluid to the front wheel brakes.

10. The method of claim 7, wherein the increasing hydraulic pressure at the front and rear wheel brakes in response to receiving the signal ceases at the predetermined braking system control point.

11. A method for automatically decelerating a vehicle having a first side with a first front wheel brake and a first rear wheel brake and second side with a second front wheel brake and a second rear wheel brake, the vehicle further having a braking system with a pump operable to deliver a flow of pressurized hydraulic fluid to the first and second front wheel brakes and to the first and second rear wheel brakes, the method comprising:
receiving a signal associated with an emergency braking event;
increasing the hydraulic pressure at the first and second front wheel brakes at a greater rate than at the first and second rear wheel brakes; and
upon achieving a targeted level of deceleration or wheel slip, increasing the hydraulic pressure at the first and second rear wheel brakes while maintaining hydraulic pressure at the first and second front wheel brakes,
wherein increasing the hydraulic pressure to the front wheel brakes at a greater rate than to the rear wheel brakes is initiated at a predetermined braking system control point, further including increasing hydraulic pressure at the front and rear wheel brakes in response to receiving the signal, wherein increasing hydraulic pressure at the front and rear wheel brakes in response to receiving the signal includes increasing hydraulic pressure at the front and rear wheel brakes at an equal rate.

* * * * *